United States Patent
Huo et al.

(10) Patent No.: US 9,453,173 B2
(45) Date of Patent: *Sep. 27, 2016

(54) METHOD AND COMPOSITION FOR INHIBITING FOAM IN A HYDROCARBON MIXTURE

(71) Applicant: SHELL OIL COMPANY, Houston, TX (US)

(72) Inventors: Zhongxin Huo, Katy, TX (US); Timothy Michael Shea, The Woodlands, TX (US); Cornelis Antonius Theodorus Kuijvenhoven, Rijwsijk (NL); Ying Zhang, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/366,782

(22) PCT Filed: Dec. 17, 2012

(86) PCT No.: PCT/US2012/070133
§ 371 (c)(1),
(2) Date: Jun. 19, 2014

(87) PCT Pub. No.: WO2013/096216
PCT Pub. Date: Jun. 27, 2013

(65) Prior Publication Data
US 2014/0345190 A1   Nov. 27, 2014

(51) Int. Cl.
| | | |
|---|---|---|
| *C10G 75/04* | (2006.01) | |
| *C07C 7/20* | (2006.01) | |
| *C09K 8/524* | (2006.01) | |
| *E21B 43/25* | (2006.01) | |
| *C10L 1/26* | (2006.01) | |
| *B01D 19/02* | (2006.01) | |
| *C09K 8/035* | (2006.01) | |
| *C10L 1/188* | (2006.01) | |
| *C10G 29/20* | (2006.01) | |
| *C10G 29/26* | (2006.01) | |
| *C10G 33/04* | (2006.01) | |

(52) U.S. Cl.
CPC ............. *C10L 1/2641* (2013.01); *B01D 19/02* (2013.01); *C09K 8/035* (2013.01); *C10G 29/20* (2013.01); *C10G 29/26* (2013.01); *C10G 33/04* (2013.01); *C10L 1/188* (2013.01)

(58) Field of Classification Search
CPC ..... C10L 1/2641; C10L 1/188; C10G 33/04; C10G 29/26; C10G 29/20; C09K 8/035; B01D 19/02
USPC ........................ 585/1, 4; 562/571
See application file for complete search history.

(56) References Cited

U.S. PATENT DOCUMENTS

| | | |
|---|---|---|
| 3,275,554 A | 9/1966 | Wagenaar |
| 3,438,757 A | 4/1969 | Honnen et al. |
| 3,565,804 A | 2/1971 | Honnen et al. |
| 3,755,433 A | 8/1973 | Miller et al. |
| 3,822,209 A | 7/1974 | Knapp et al. |
| 3,996,059 A | 12/1976 | Stansfield et al. |
| 4,224,212 A | 9/1980 | Topham |
| 4,349,389 A | 9/1982 | Schoefield |
| 4,540,448 A | 9/1985 | Gautier et al. |
| 4,882,034 A | 11/1989 | Tack et al. |
| 5,000,792 A | 3/1991 | Ohta et al. |
| 5,300,255 A | 4/1994 | Campbell et al. |
| 5,425,422 A | 6/1995 | Jamaluddin et al. |
| 5,536,445 A | 7/1996 | Campbell et al. |
| 5,646,212 A | 7/1997 | Hibbert |
| 5,753,022 A | 5/1998 | Schoefield et al. |
| 5,833,721 A | 11/1998 | Hart et al. |
| 5,855,629 A | 1/1999 | Grundy et al. |
| 5,858,927 A | 1/1999 | Poelker et al. |
| 6,444,784 B1 | 9/2002 | Patil et al. |
| 7,097,759 B2 | 8/2006 | Mukkamala |
| 7,795,183 B2 | 9/2010 | Wilkes et al. |
| 9,090,494 B2 * | 7/2015 | Jones ................. A01N 57/20 |
| 9,150,472 B2 * | 10/2015 | Huo ..................... C10G 75/04 |
| 2002/0033265 A1 | 3/2002 | Varadaraj |
| 2007/0042911 A1 | 2/2007 | Fletcher |
| 2010/0024286 A1 * | 2/2010 | Smith ................. C10L 10/08 44/404 |
| 2010/0024287 A1 * | 2/2010 | Smith ................. C10L 1/00 44/410 |
| 2010/0084597 A1 | 4/2010 | Schwab et al. |
| 2011/0092393 A1 | 4/2011 | Faust et al. |
| 2011/0207640 A1 | 8/2011 | Carty et al. |
| 2014/0073543 A1 * | 3/2014 | Bartley ............... C10L 1/143 508/290 |

FOREIGN PATENT DOCUMENTS

| | | | |
|---|---|---|---|
| CA | WO 03020843 A1 * | 3/2003 | ............ C07C 9/00 |
| CN | 101081806 | 12/2007 | |
| CN | 101502728 | 2/2008 | |
| CN | 101711525 | 5/2010 | |

(Continued)

OTHER PUBLICATIONS

EIC Search Oct. 20, 2015.*
EIC Search (2) Oct. 20, 2015.*
PCT International Search Report, Application No. PCT/US2012/070133 dated Apr. 25, 2013.
Morao, A. etal. 'Effect of antifoam addition on gas-liquid mass transfer in stirred fermenters.' Bioprocess Engineering, 1999, vol. 20, pp. 165-172.

(Continued)

*Primary Examiner* — Pamela H Weiss

(57) ABSTRACT

A method of inhibiting the formation of foam in a mixture comprising water and hydrocarbons, the method comprising contacting the mixture with a composition which comprises at least one ionic liquid. The ionic liquid is preferably a poly(hydroxycarboxylic acid) amide salt derivative or an alkyl ethoxylate phosphate salt.

7 Claims, No Drawings

(56) References Cited

FOREIGN PATENT DOCUMENTS

| | | | |
|---|---|---|---|
| CN | 102105572 | 6/2011 | |
| EP | 0164817 A2 | 12/1985 | |
| GB | 1342746 | 1/1974 | |
| GB | 1373660 | 11/1974 | |
| GB | EP 0164817 A2 * | 12/1985 | .......... B01F 17/0021 |
| GB | WO 03021031 A1 * | 3/2003 | .......... C23C 11/167 |
| GB | WO 2006111712 A2 * | 10/2006 | .......... B01F 17/0042 |
| GB | EP 1920824 A1 * | 5/2008 | .............. C07F 9/091 |
| WO | 2005100517 A1 | 10/2005 | |
| WO | 2006111712 A2 | 10/2006 | |
| WO | 2010014678 A1 | 2/2010 | |
| WO | 2010015706 A1 | 2/2010 | |
| WO | 2011149799 | 12/2011 | |

OTHER PUBLICATIONS

Predel, T. et al. 'Ionic Liquids as Alternative Lubricants for Special Applications.' Chemical Engineering & Technology, 2010, vol. 33, No. 1, pp. 132-136.

Jose-Alberto, M. et al. 'Current Knowledge and Potential Applications of Ionic Liquids in the Petroleum Industry' Ionic Liquides : Applications and Perspectives. Feb. 21, 2011, Chapter 18, pp. 439-458.

* cited by examiner

METHOD AND COMPOSITION FOR INHIBITING FOAM IN A HYDROCARBON MIXTURE

PRIORITY CLAIM

The present application is a National Stage (§371) application of PCT/US2012/070133, filed Dec. 17, 2012, which claims priority from U.S. Provisional Application 61/578,316, filed Dec. 21, 2011, each of which are hereby incorporated by reference in their entirety.

CROSS-REFERENCE TO RELATED APPLICATIONS

This application claims the benefit of U.S. Provisional Application No. 61/578,316, filed Dec. 21, 2011, which is incorporated herein by reference. cl FIELD OF THE INVENTION The invention relates to methods and compositions for inhibiting the formation of foam and in one embodiment to methods and compositions for inhibiting the formation of foam during the production of oil and gas.

BACKGROUND

Oil and gas produced from a production well are known to form foam as the hydrocarbon is produced from the well, transported and processed. Foam can be produced, for example, as a result of impurities in the hydrocarbon and often as a result of undergoing depressurization to release entrapped gas. The foam makes it difficult to transport and process the hydrocarbon mixture and can result in difficulties in separating the oil from the gas. Anti-foaming agents, especially silicone based agents are typically used to control foaming in order to increase the separation efficiency and thereby increase production capacity.

The use of silicone based material, however, is detrimental to the value of the produced hydrocarbon because it can have negative impacts on the refineries and other units used to further process the hydrocarbon.

SUMMARY OF THE INVENTION

This invention provides a method of inhibiting the formation of foam in a mixture comprising water and hydrocarbons, the method comprising contacting the mixture with a composition which comprises at least one ionic liquid.

This invention further provides a composition for inhibiting the formation of foam in a hydrocarbon water mixture which comprises at least one ionic liquid.

This invention also provides a foam inhibited mixture comprising water, hydrocarbons, and a composition comprising at least one ionic liquid.

DETAILED DESCRIPTION OF THE INVENTION

The present invention is directed to a method of treating hydrocarbons produced from oil and gas production wells. These hydrocarbons are prone to foaming during the production, transport and processing steps which these hydrocarbons undergo. The present invention addresses this problem by treating the hydrocarbons with a composition comprising one or more ionic liquids. The ionic liquid(s) may be combined with additional components known to those of ordinary skill in the art that are useful for treating hydrocarbons produced from hydrocarbon production wells.

Ionic liquids are generally defined as molten salts which are liquid at room temperature or by definition have a melting point of less than 100° C. They have virtually no vapor pressure and can exhibit high thermal stability. As the term ionic liquid is used in this application, it may apply to the above described molten salts or to the salts dissolved in solution, aqueous or otherwise.

An ionic liquid can be presented by the formula $C^+A^-$ wherein $C^+$ is a suitable cation and $A^-$ is a suitable anion.

Alkyl Ethoxylate Phosphate Salt Embodiment

One preferred embodiment of an ionic liquid is an alkyl ethoxylate phosphate salt of the general chemical formula (I):

$$R(C_2H_4O)_xPO_4^+ X^{q-} \quad (I)$$

wherein R is an optionally substituted hydrocarbyl group, x is from 1 to 30 and q is 1 to 4.

That is to say, in formula (I), R is preferably an optionally substituted aromatic, aliphatic or cycloaliphatic straight chain or branched divalent hydrocarbyl group. More preferably, A is an arylene, alkylene or alkenylene group, in particular an arylene, alkylene or alkenylene group containing up to 50 carbon atoms, preferably in the range of from 4 to 25 carbon atoms, more preferably in the range of from 6 to 25 carbon atoms, more preferably in the range of from 8 to 24 carbon atoms, more preferably in the range of from 10 to 22 carbon atoms, and most preferably in the range of from 12 to 20 carbon atoms. For example, the optionally substituted hydrocarbyl group R may be conveniently selected from heptyl, octyl, undecyl, lauryl, heptadecyl, heptadenyl, heptadecadienyl, stearyl, oleyl and linoleyl.

In the compound of formula (I), the optional substituents in the group R are preferably selected from hydroxy, halo or alkoxy groups, especially $C_{1-4}$ alkoxy groups. In formula (I), R is preferably an optionally substituted hydrocarbyl group as hereinafter described for formula (I).

Other examples of said optionally substituted hydrocarbyl group R in formula (I) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group R in formula (I) may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulfur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group R will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

More preferably, the hydrocarbyl group R in formula (I) is unsubstituted or substituted by a group selected from hydroxy, halo or alkoxy group, even more preferably $C_{1-4}$ alkoxy.

In formula (I), x is in the range of from 1 to 30. Preferably, the lower limit of the range for x is 1, more preferably 2, even more preferably 3; preferably the upper limit of the range for x is 30, more preferably 25, more preferably 22, more preferably 20, and even more preferably 18 (i.e. x may be selected from any of the following ranges: from 1 to 30; from 2 to 30; from 3 to 30; from 1 to 25; from 2 to 25; from 3 to 25; from 1 to 22; from 2 to 22; from 3 to 22; from 1 to 20; from 2 to 20; from 3 to 20; from 1 to 18; from 2 to 18; and, from 3 to 18).

The anion $X^{q-}$ of the compound of formula (I) is not critical and can be any anion (or mixture of anions) suitable to balance the positive charge of the alkyl ethoxylate phosphate cation.

The anion $X^{q-}$ of the compound of formula (I) may conveniently be a sulfur-containing anion, such as an anion selected from sulfate and sulfonate anions.

However, it may be desirable to maintain a low sulfur content in the oil and gas being produced so the use of non-sulfur-containing anions in the compounds of formula (I) may be desirable depending upon the concentration of sulfur in the oil and gas and/or the desired concentration of sulfur in the oil and gas composition containing the one or more alkyl ethoxylate phosphate salts.

Therefore, the anion $X^{q-}$ of the compound of formula (I) can also be any non-sulfur-containing anion (or mixture of anions) suitable to balance the positive charge of the alkyl ethoxylate phosphate cation, such as a non-sulfur-containing organic anion or a non-sulfur-containing inorganic anion.

Non-limiting examples of suitable anions are $OH^-$, $CH^-$, $NH_3^-$, $HCO_3^-$, $HCOO^-$, $CH_3COO^-$, $H^-$, $BO_3^{3-}$, $CO_3^{2-}$, $C_2H_3O_2^-$, $HCO^{2-}$, $C_2O_4^{2-}$, $HC_2O_4^-$, $NO_3^-$, $NO_2^-$, $N^{3-}$, $NH_2^-$, $O^{2-}$, $O_2^{2-}$, $BeF_3^-$, $F^-$, $Na^-$, $[Al(H_2O)_2(OH)_4]^-$, $SiO_3^{2-}$, $SiF_6^{2-}$, $H_2PO_4^-$, $P^{3-}$, $PO_4^{3-}$, $HPO_4^{2-}$, $Cl^-$, $ClO_3^-$, $ClO_4^-$, $ClO^-$, $KO^-$, $SbOH_6^-$, $SnCl_6^{2-}$, $[SnTe4]^{4-}$, $CrO_4^{2-}$, $Cr_2O_7^{2-}$, $MnO_4^-$, $NiCl_6^{2-}$, $[Cu(CO_3)_2(OH)_2]^{4-}$, $AsO_4^{3-}$, $Br^-$, $BrO_3^-$, $IO_3^-$, $I^-$, $CN^-$, $OCN^-$, etc.

Suitable anions may also include anions derived from compounds containing a carboxylic acid group (e.g. a carboxylate anion), anions derived from compounds containing a hydroxyl group (e.g. an alkoxide, phenoxide or enolate anion), nitrogen based anions such as nitrate and nitrite, phosphorus based anions such as phosphates and phosphonates, or mixtures thereof.

Non-limiting examples of suitable anions derived from compounds containing a carboxylic acid group include acetate, oleate, salicylate anions, and mixtures thereof.

Non-limiting examples of suitable anions derived from compounds containing a hydroxyl group include phenate anions, and mixtures thereof.

In a preferred embodiment of the present invention, the anion $X^{q-}$ is a non-sulfur-containing anion selected from the group consisting of OH, a phenate group, a salicylate group, an oleate group and an acetate group; more preferably the anion $X^{q-}$ is OH.

Preferred embodiments of cations include alkyl ethoxylate phosphates having alkyl chains with from 10 to 26 carbon atoms, 1 to 24 EO groups and a phosphate. One especially preferred embodiment is an alkyl ethoxylate phosphate having from 12 to 14 carbon atoms, 4-20 EO groups and a phosphate. Another preferred embodiment is an alkyl ethoxylate phosphate having 24 carbon atoms, 1 to 16 EO groups and a phosphate.

The ionic liquid comprising treatment fluid may optionally further comprise triethanol amine (TEA) and/or triethanol amine with the addition of $C_8H_8$.

Poly(hydroxycarboxylic acid) Amide Salt Derivative Embodiment

Another preferred embodiment of an ionic liquid is a poly(hydroxycarboxylic acid) amide salt derivative. The poly(hydroxycarboxylic acid) amide salt derivative(s) may be combined with additional components known to those of ordinary skill in the art that are useful for treating hydrocarbons produced from hydrocarbon production wells.

The poly(hydroxycarboxylic acid) amide salt derivatives used in the present invention may also be referred to as hyperdispersants. The one or more poly(hydroxycarboxylic acid) amide salt derivatives of the present invention are poly(hydroxycarboxylic acid) amide salt derivatives having formula (III):

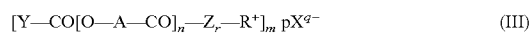

$$[Y-CO[O-A-CO]_n-Z_r-R^+]_m \, pX^{q-} \quad (III)$$

wherein Y is hydrogen or optionally substituted hydrocarbyl group, A is a divalent optionally substituted hydrocarbyl group, n is from 1 to 100, m is from 1 to 4, q is from 1 to 4 and p is an integer such that pq=m, Z is an optionally substituted divalent bridging group which is attached to the carbonyl group through a nitrogen atom, r is 0 or 1, $R^+$ is an ammonium group and $X^{q-}$ is an anion.

$R^+$ may be a primary, secondary, tertiary or quaternary ammonium group. $R^+$ is preferably a quaternary ammonium group.

In formula (III), A is preferably a divalent straight chain or branched hydrocarbyl group as hereafter described for formulas (I) and (II) below.

That is to say, in formula (III), A is preferably an optionally substituted aromatic, aliphatic or cycloaliphatic straight chain or branched divalent hydrocarbyl group. More preferably, A is an arylene, alkylene or alkenylene group, in particular an arylene, alkylene or alkenylene group containing in the range of from 4 to 25 carbon atoms, more preferably in the range of from 6 to 25 carbon atoms, more preferably in the range of from 8 to 24 carbon atoms, more preferably in the range of from 10 to 22 carbon atoms, and most preferably in the range of from 12 to 20 carbon atoms.

Preferably, in said compound of formula (III), there are at least 4 carbon atoms, more preferably at least 6 carbon atoms, and even more preferably in the range of from 8 to 14 carbon atoms connected directly between the carbonyl group and the oxygen atom derived from the hydroxyl group.

In the compound of formula (III), the optional substituents in the group A are preferably selected from hydroxy, halo or alkoxy groups, especially $C_{1-4}$ alkoxy groups.

In formula (III) (and formula (IV)), n is in the range of from 1 to 100. Preferably, the lower limit of the range for n is 1, more preferably 2, even more preferably 3; preferably the upper limit of the range for n is 100, more preferably 60, more preferably 40, more preferably 20, and even more preferably 10 (i.e. n may be selected from any of the following ranges: from 1 to 100; from 2 to 100; from 3 to 100; from 1 to 60; from 2 to 60; from 3 to 60; from 1 to 40; from 2 to 40; from 3 to 40; from 1 to 20; from 2 to 20; from 3 to 20; from 1 to 10; from 2 to 10; and, from 3 to 10).

In formula (III), Y is preferably an optionally substituted hydrocarbyl group as hereinafter described for formula (IV).

That is to say, the optionally substituted hydrocarbyl group Y in formula (III) is preferably aryl, alkyl or alkenyl containing up to 50 carbon atoms, more preferably in the range of from 7 to 25 carbon atoms. For example, the optionally substituted hydrocarbyl group Y may be conveniently selected from heptyl, octyl, undecyl, lauryl, heptadecyl, heptadenyl, heptadecadienyl, stearyl, oleyl and linoleyl.

Other examples of said optionally substituted hydrocarbyl group Y in formula (III) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group Y in formula (III) may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulfur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group Y will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

More preferably, the hydrocarbyl group Y in formula (III) is unsubstituted or substituted by a group selected from hydroxy, halo or alkoxy group, even more preferably $C_{1-4}$ alkoxy.

Most preferably, the optionally substituted hydrocarbyl group Y in formula (III) is a stearyl group, 12-hydroxystearyl group, an oleyl group or a 12-hydroxyoleyl group, and that derived from naturally occurring oil such as tall oil fatty acid.

In formula (III), Z is preferably an optionally substituted divalent bridging group represented by formula (V)

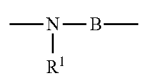

(V)

wherein $R^1$ is hydrogen or a hydrocarbyl group and B is an optionally substituted alkylene group.

Examples of hydrocarbyl groups that may represent $R^1$ include methyl, ethyl, n-propyl, n-butyl and octadecyl. Examples of optionally substituted alkylene groups that may represent B include ethylene, trimethylene, tetramethylene and hexamethylene. Examples of preferred Z moieties in formula (III) include —NHCH$_2$CH$_2$—, —NHCH$_2$C(CH$_3$)$_2$CH$_2$— and —NH(CH$_2$)$_3$—.

In formula (III), r is preferably 1, i.e. the poly(hydroxycarboxylic acid) amide salt derivative having formula (III) must contain the optionally substituted divalent bridging group Z.

Preferably, $R^+$ may be represented by formula (VI)

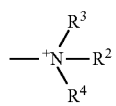

(VI)

wherein $R^2$, $R^3$ and $R^4$ may be selected from hydrogen and alkyl groups such as methyl.

The anion $X^{q-}$ of the compound of formula (III) is not critical and can be any anion (or mixture of anions) suitable to balance the positive charge of the poly(hydroxycarboxylic acid) amide cation.

The anion $X^{q-}$ of the compound of formula (III) may conveniently be a sulfur-containing anion, such as an anion selected from sulfate and sulfonate anions.

However, it may be desirable to maintain a low sulfur content in the oil and gas being produced so the use of non-sulfur-containing anions in the compounds of formula (III) may be desirable depending upon the concentration of sulfur in the oil and gas and/or the desired concentration of sulfur in the oil and gas composition containing the one or more poly(hydroxycarboxylic acid) amide salt derivatives.

Therefore, the anion $X^{q-}$ of the compound of formula (III) can also be any non-sulfur-containing anion (or mixture of anions) suitable to balance the positive charge of the poly (hydroxycarboxylic acid) amide cation, such as a non-sulfur-containing organic anion or a non-sulfur-containing inorganic anion.

Non-limiting examples of suitable anions are $OH^-$, $CH^-$, $NH_3^-$, $HCO_3^-$, $HCOO^-$, $CH_3COO^-$, $H^-$, $BO_3^{3-}$, $CO_3^{2-}$, $C_2H_3O_2^-$, $HCO^{2-}$, $C_2O_4^{2-}$, $HC_2O_4^-$, $NO_3^-$, $NO_2^-$, $N^{3-}$, $NH_2^-$, $O^{2-}$, $O_2^{2-}$, $BeF_3^-$, $F^-$, $Na^-$, $[Al(H_2O)_2(OH)_4]^-$, $SiO_3^{2-}$, $SiF_6^{2-}$, $H_2PO_4^-$, $P^{3-}$, $PO_4^{3-}$, $HPO_4^{2-}$, $Cl^-$, $ClO_3^-$, $ClO_4^-$, $ClO^-$, $KO^-$, $SbOH_6^-$, $SnCl_6^{2-}$, $[SnTe4]^{4-}$, $CrO_4^{2-}$, $Cr_2O_7^{2-}$, $MnO_4^-$, $NiCl_6^{2-}$, $[Cu(CO_3)_2(OH)_2]^{4-}$, $AsO_4^{3-}$, $Br^-$, $BrO_3^-$, $IO_3^-$, $I^-$, $CN^-$, $OCN^-$, etc.

Suitable anions may also include anions derived from compounds containing a carboxylic acid group (e.g. a carboxylate anion), anions derived from compounds containing a hydroxyl group (e.g. an alkoxide, phenoxide or enolate anion), nitrogen based anions such as nitrate and nitrite, phosphorus based anions such as phosphates and phosphonates, or mixtures thereof.

Non-limiting examples of suitable anions derived from compounds containing a carboxylic acid group include acetate, oleate, salicylate anions, and mixtures thereof.

Non-limiting examples of suitable anions derived from compounds containing a hydroxyl group include phenate anions, and mixtures thereof.

In a preferred embodiment of the present invention, the anion $X^{q-}$ is a non-sulfur-containing anion selected from the group consisting of OH, a phenate group, a salicylate group, an oleate group and an acetate group; more preferably the anion $X^{q-}$ is OH.

The one or more poly(hydroxycarboxylic acid) amide salt derivatives may be obtained by reaction of an amine and a poly(hydroxycarboxylic acid) of formula (IV)

$$Y\text{—}CO[O\text{—}A\text{—}CO]_n\text{—}OH \qquad (IV)$$

wherein Y is hydrogen or optionally substituted hydrocarbyl group, A is a divalent optionally substituted hydrocarbyl group and n is from 1 to 100, with an acid or a quaternizing agent.

As used herein, the term "hydrocarbyl" represents a radical formed by removal of one or more hydrogen atoms from a carbon atom of a hydrocarbon (not necessarily the same carbon atoms in case more hydrogen atoms are removed).

Hydrocarbyl groups may be aromatic, aliphatic, acyclic or cyclic groups. Preferably, hydrocarbyl groups are aryl, cycloalkyl, alkyl or alkenyl, in which case they may be straight-chain or branched-chain groups.

Representative hydrocarbyl groups include phenyl, naphthyl, methyl, ethyl, butyl, pentyl, methylpentyl, hexenyl, dimethylhexyl, octenyl, cyclooctenyl, methylcyclooctenyl, dimethylcyclooctyl, ethylhexyl, octyl, isooctyl, dodecyl, hexadecenyl, eicosyl, hexacosyl, triacontyl and phenylethyl.

In the present invention, the phrase "optionally substituted hydrocarbyl" is used to describe hydrocarbyl groups optionally containing one or more "inert" heteroatom-containing functional groups. By "inert" is meant that the functional groups do not interfere to any substantial degree with the function of the compound.

The optionally substituted hydrocarbyl group Y in formula (IV) herein is preferably aryl, alkyl or alkenyl containing up to 50 carbon atoms, more preferably in the range of from 7 to 25 carbon atoms. For example, the optionally substituted hydrocarbyl group Y may be conveniently selected from heptyl, octyl, undecyl, lauryl, heptadecyl, heptadenyl, heptadecadienyl, stearyl, oleyl and linoleyl.

Other examples of said optionally substituted hydrocarbyl group Y in formula (IV) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group Y may contain one or more functional groups such as carbonyl, carboxyl, nitro, hydroxy, halo, alkoxy, tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulfur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group Y will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

The hydrocarbyl group Y in formula (IV) is more preferably unsubstituted or substituted by a group selected from hydroxy, halo or alkoxy group, even more preferably $C_{1-4}$ alkoxy.

Most preferably, the optionally substituted hydrocarbyl group Y in formula (I) is a stearyl group, 12-hydroxystearyl group, an oleyl group, a 12-hydroxyoleyl group or a group derived from naturally occurring oil such as tall oil fatty acid.

In one embodiment of the present invention, at least one of, or all of, the one or more poly(hydroxycarboxylic acid) amide salt derivatives are sulfur-containing poly(hydroxycarboxylic acid) amide salt derivatives.

In such an embodiment, said one or more poly(hydroxycarboxylic acid) amide salt derivatives preferably have a sulfur content of at most 2.5 wt. %, such as a sulfur content in the range of from 0.1 to 2.0 wt. %, conveniently in the range of from 0.6 to 1.2 wt. % sulfur, as measured by ICP-AES, based on the total weight of said poly(hydroxycarboxylic acid) amide salt derivatives.

In another embodiment of the present invention, the one or more poly(hydroxycarboxylic acid) amide salt derivatives are non-sulfur-containing poly(hydroxycarboxylic acid) amide salt derivatives.

The preparation of polyhydroxycarboxylic acid and its amide or other derivatives is known and is described, for instance, in EP 0164817, U.S. Pat. Nos. 5,753,022, 5,646, 212, 5,536,445, 4,224,212, GB 1342746, GB 1373660, U.S. Pat. Nos. 5,000,792 and 4,349,389 which disclosures are herein incorporated by reference.

The polyhydroxycarboxylic acids of formula (IV) may be made by the interesterification of one or more hydroxycarboxylic acids of formula (II)

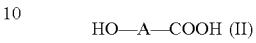

HO—A—COOH (II)

wherein A is a divalent optionally substituted hydrocarbyl group, optionally in the presence of a catalyst according to well known methods. Such methods are described, for example, in U.S. Pat. No. 3,996,059, GB 1373660 and GB 1342746.

The chain terminator in said interesterification may be a non-hydroxycarboxylic acid.

The hydroxyl group in the hydroxycarboxylic acid and the carboxylic acid group in the hydroxycarboxylic acid or the non-hydroxycarboxylic acid may be primary, secondary or tertiary in character.

The interesterification of the hydroxycarboxylic acid and the non-hydroxycarboxylic acid chain terminator may be effected by heating the starting materials, optionally in a suitable hydrocarbon solvent such as toluene or xylene, and azeotroping off the formed water. The reaction may be carried out at a temperature up to –250° C., conveniently at the reflux temperature of the solvent.

Where the hydroxyl group in the hydroxycarboxylic acid is secondary or tertiary, the temperature employed should not be so high as to lead to dehydration of the acid molecule.

Catalysts for the interesterification, such as p-toluenesulfonic acid, zinc acetate, zirconium naphthenate or tetrabutyl titanate, may be included, with the objective of either increasing the rate of reaction at a given temperature or of reducing the temperature required for a given rate of reaction.

In the compounds of formula (IV) and (II), A is preferably an optionally substituted aromatic, aliphatic or cycloaliphatic straight chain or branched divalent hydrocarbyl group. Preferably, A is an arylene, alkylene or alkenylene group, in particular an arylene, alkylene or alkenylene group containing in the range of from 4 to 25 carbon atoms, more preferably in the range of from 6 to 25 carbon atoms, more preferably in the range of from 8 to 24 carbon atoms, more preferably in the range of from 10 to 22 carbon atoms, and most preferably in the range of from 12 to 20 carbon atoms.

Preferably, in said compounds of formula (IV) and (II), there are at least 4 carbon atoms, more preferably at least 6 carbon atoms, and even more preferably in the range of from 8 to 14 carbon atoms connected directly between the carbonyl group and the oxygen atom derived from the hydroxyl group.

In the compounds of formula (IV) and (II), the optional substituents in the group A are preferably selected from hydroxy, halo or alkoxy groups, more preferably $C_{1-4}$ alkoxy groups.

The hydroxyl group in the hydroxycarboxylic acids of formula (II) is preferably a secondary hydroxyl group.

Examples of suitable hydroxycarboxylic acids are 9-hydroxystearic acid, 10-hydroxystearic acid, 12-hydroxystearic acid, 12-hydroxy-9-oleic acid (ricinoleic acid), 6-hydroxycaproic acid, preferably 12-hydroxystearic acid. Commercial 12-hydroxystearic acid (hydrogenated castor oil fatty acid) normally contains up to 15% wt of stearic acid and other non-hydroxycarboxylic acids as impurities and can conveniently be used without further admixture to produce a polymer of molecular weight about 1000-2000.

Where the non-hydroxycarboxylic acid is introduced separately to the reaction, the proportion which is required in order to produce a polymer or oligomer of a given molecular weight can be determined either by simple experiment or by calculation by the person skilled in the art.

The group (—O—A—CO—) in the compounds of formula (IV) and (II) is preferably a 12-oxystearyl group, 12-oxyoleyl group or a 6-oxycaproyl group.

Preferred polyhydroxycarboxylic acids of formula (IV) for reaction with amine include poly(hydroxystearic acid) and poly(hydroxyoleic acid).

The amines which react with polyhydroxycarboxylic acids of formula (IV) to form poly(hydroxycarboxylic acid) amide intermediates may include those defined in U.S. Pat. No. 5,855,629.

For example, various amines and their preparations are described in U.S. Pat. Nos. 3,275,554, 3,438,757, 3,454,555, 3,565,804, 3,755,433, and 3,822,209 which disclosures are herein incorporated by reference.

The amine reactant is preferably a diamine, a triamine or a polyamine. Preferred amine reactants are diamines selected from ethylenediamine, N,N-dimethyl-1,3-propanediamine, triamines and polyamines selected from dietheylenetriamine, triethylenetetramine, tetraethylenepentamine, pentaethylenehexamine and tris(2-aminoethyl)amine.

The amidation between the amine reactant and the poly (hydroxycarboxylic acid) of formula (I) may be carried out according to methods known to those skilled in the art, by heating the poly(hydroxycarboxylic acid) with the amine reactant, optionally in a suitable hydrocarbon solvent such as toluene or xylene, and azeotroping off the formed water. Said reaction may be carried out in the presence of a catalyst such as p-toluenesulfonic acid, zinc acetate, zirconium naphthenate or tetrabutyl titanate.

The poly(hydroxycarboxylic acid) amide intermediate formed from reaction of the amine and the poly(hydroxycarboxylic acid) of formula (IV) is reacted with an acid or a quaternizing agent to form a salt derivative, according to well-known methods.

Acids that may be used to form the salt derivative may be selected from organic or inorganic acids. Said acids are conveniently selected from carboxylic acids, nitrogen-containing organic and inorganic acids, sulfur-containing organic or inorganic acids (such as sulfuric acid, methanesulfonic acid and benzenesulfonic acid).

Quaternizing agents that may be used to form the salt derivative may be selected from dimethylsulfuric acid, a dialkyl sulfate having from 1 to 4 carbon atoms, an alkyl halide such as methyl chloride, methyl bromide, aryl halide such as benzyl chloride.

In a preferred embodiment, the quaternizing agent is a sulfur-containing quaternizing agent, in particular dimethylsulfuric acid or an dialkyl sulfate having from 1 to 4 carbon atoms. The quaternizing agent is preferably dimethyl sulfate.

Quaternization is a well-known method in the art. For example, quaternization using dimethyl sulfate is described in U.S. Pat. Nos. 3,996,059, 4,349,389 and GB 1373660.

Poly(hydroxycarboxylic acid) amide salt derivatives that are preferred in the present invention are those which each have a TBN (total base number) value of less than 10 mg KOH/g, as measured by ASTM D 4739. More preferably, the poly(hydroxycarboxylic acid) amide salt derivatives each have a TBN value of less than 5 mg KOH/g, most preferably 2 mg KOH/g or less, as measured by ASTM D 4739.

The ionic liquid comprising treatment fluid may be injected into a production well, into an injection well, into the hydrocarbon production system or in any other manner known to one of ordinary skill in the art. The treatment fluid may be injected at one or more locations and more than one different treatment fluid may be injected together or separately in different locations or at different times.

The method of the present invention reduces or inhibits the formation of foam as shown in the following illustrative examples.

EXAMPLES

Example 1

Example 1 demonstrates the ability of a poly(hydroxycarboxylic acid) amide salt derivative to reduce foaming. Two samples of oil were tested to determine the amount of foam generated when air was passed through the sample. The first sample (Sample A) was untreated, but the second sample (Sample B) was treated with 1000 ppm of a poly (hydroxycarboxylic acid) amide salt derivative. Air was passed through Sample A at a rate of 10 cc/s for 15 seconds and then the air flow was stopped. For Sample B, air was passed through the sample at a rate of 20 cc/s for 15 seconds and then the air flow was stopped. The air flow for Sample B was doubled to 20 cc/s because no foam was observed when the air was passed through at 10 cc/s. The total volume of each sample and the foam volume of each sample at different times are shown in Table 1.

TABLE 1

|  | Sample A | | Sample B | |
| --- | --- | --- | --- | --- |
| Time (s) | Total Volume (ml) | Foam Volume (ml) | Total Volume (ml) | Foam Volume (ml) |
| 0 | 50 | 0 | 50 | 0 |
| 15 | 120 | 70 | 65 | 15 |
| 30 | 100 | 50 | 58 | 8 |
| 45 | 90 | 40 | 54 | 4 |
| 60 | 85 | 35 | 52 | 2 |
| 75 | 70 | 20 | 51 | 1 |
| 90 | 63 | 13 | 51 | 1 |
| 105 | 55 | 5 | 51 | 1 |
| 120 | 52 | 2 | 51 | 1 |
| 135 | 51 | 1 | 50 | 0 |

Example 2

Example 2 demonstrates the ability of an alkyl ethoxylate phosphate salt to reduce foaming. Two samples of crude oil were tested to determine how long it would take for the oil to expand to three expansions (i.e., sufficient foam was generated to increase the volume of the oil by a factor of 3). The first sample was untreated oil. It took 0.9 minutes for the oil to reach three expansions. The second sample was the same oil, but with 1000 ppmw of an alkyl ethoxylate phosphate salt. It took 3.0 minutes for the treated oil to reach three expansions. This shows that the alkyl ethoxylate phosphate salt reduces the amount of foam formed under given conditions.

The invention claimed is:

1. A method of treating hydrocarbons produced from a hydrocarbon production well, the method comprising:

injecting an ionic liquid comprising treatment fluid into a production well, wherein the ionic liquid comprises a poly(hydroxycarboxylic acid) amide salt derivative having the chemical formula $[Y-CO[O-A-CO]_n-Z_r-R^+]_m\, pX^{q-}$, wherein Y is hydrogen or hydrocarbyl group, A is a divalent hydrocarbyl group, n is from 1 to 100, m is from 1 to 4, q is from 1 to 4 and p is an integer such that pq =m, Z is a divalent bridging group which is attached to the carbonyl group through a nitrogen atom, r is 0 or 1, $R^+$ is an ammonium group and $X^{q-}$ is an anion and contacting a mixture comprising water and hydrocarbons with the ionic liquid comprising treatment fluid.

2. The method of claim 1, wherein $R^+$ is a quaternary ammonium group.

3. The method of claim 1, wherein A is an arylene, alkylene, or alkenylene group.

4. The method of claim 1, wherein A is an arylene alkylene, or alkenylene group containing in the range of from 12 to 20 carbon atoms.

5. The method of claim 1, wherein the chemical formula has 8 to 14 carbon atoms connected directly between the carbonyl group and the oxygen atom derived from the hydroxyl group.

6. The method of claim 1, wherein n is in the range of from 3 to 10.

7. The method of claim 1, wherein Y is a stearyl group, a 12-hydroxystearyl group, an oleyl group, or a 12-hydroxyoleyle group.

\* \* \* \* \*